United States Patent
Iijima

(10) Patent No.: US 7,190,426 B2
(45) Date of Patent: Mar. 13, 2007

(54) SCATTERING POLARIZING PLATE HAVING A TRANSMISSION AND DIFFUSION AXIS, WITH THE TRANSMISSION AXIS BEING PERPENDICULAR TO THE TRANSMISSION AXIS OF THE POLARIZING PLATE

(75) Inventor: Chiyoaki Iijima, Ina (JP)

(73) Assignee: Seiko Epson Corporation (JP)

( * ) Notice: Subject to any disclaimer, the term of this patent is extended or adjusted under 35 U.S.C. 154(b) by 141 days.

(21) Appl. No.: 10/951,271

(22) Filed: Sep. 27, 2004

(65) Prior Publication Data

US 2005/0094064 A1    May 5, 2005

(30) Foreign Application Priority Data

Sep. 29, 2003   (JP) ............... 2003-337817

(51) Int. Cl.
*G02F 1/1333*    (2006.01)
(52) U.S. Cl. ............... 349/87; 349/86; 349/96; 349/112; 349/114
(58) Field of Classification Search ............... 349/194, 349/87

See application file for complete search history.

(56) References Cited

U.S. PATENT DOCUMENTS

| | | | | |
|---|---|---|---|---|
| 5,825,543 | A * | 10/1998 | Ouderkirk et al. | 359/494 |
| 5,995,183 | A * | 11/1999 | Tsuyoshi | 349/112 |
| 2002/0154257 | A1* | 10/2002 | Iijima | 349/67 |
| 2003/0047711 | A1* | 3/2003 | Kawata et al. | 252/299.01 |
| 2003/0063239 | A1* | 4/2003 | Suzuki | 349/106 |
| 2003/0103177 | A1 | 6/2003 | Maeda | |

FOREIGN PATENT DOCUMENTS

| | | |
|---|---|---|
| JP | 2000-235180 | 8/2000 |
| JP | 2001-209051 | 8/2001 |
| JP | 2003-156624 | 5/2003 |
| KR | 2002-0079515 | 10/2002 |

OTHER PUBLICATIONS

Communication from Korean Patent Office regarding counterpart application.

\* cited by examiner

*Primary Examiner*—Andrew Schechter
*Assistant Examiner*—Lucy Chien
(74) *Attorney, Agent, or Firm*—Harness, Dickey & Pierce, P.L.C.

(57) ABSTRACT

A reflective liquid crystal device is provided in which external light incident on a liquid crystal layer through a polarizing plate is reflected from a reflecting layer and then exits to the outside through the liquid crystal layer and the polarizing plate to display an image. A forward scattering type polarizing plate having a transmission axis and a diffusion axis is arranged between the polarizing plate and the liquid crystal layer such that the transmission axis of the forward scattering type polarizing plate is perpendicular to the transmission axis of the polarizing plate.

11 Claims, 6 Drawing Sheets

PRIOR ART

SCATTERING POLARIZING PLATE HAVING A TRANSMISSION AND DIFFUSION AXIS, WITH THE TRANSMISSION AXIS BEING PERPENDICULAR TO THE TRANSMISSION AXIS OF THE POLARIZING PLATE

RELATED APPLICATIONS

This application claims priority to Japanese Patent Application No. 2003-337817 filed Sep. 29, 2003 which is hereby expressly incorporated by reference herein in its entirety.

BACKGROUND

1. Technical Field

The present invention relates to a liquid crystal device having a reflective or transflective display element and an electronic apparatus using the same, and more specifically, to a liquid crystal device capable of displaying a bright and high-contrast image and to an electronic apparatus using the same.

2. Background Art

In general, conventional liquid crystal devices have a structure in which a liquid crystal layer composed of liquid crystal molecules is interposed between a first substrate and a second substrate opposite to each other, and two polarizing plates are arranged in a spaced relation so as to interpose the liquid crystal layer therebetween. A liquid crystal device has been suggested in which a light scattering layer is arranged to improve the utilization efficiency of light or to widen a viewing angle of the screen on which images are displayed.

For example, as shown in FIG. 6, a reflective liquid crystal device comprises a liquid crystal panel 115 having a reflecting layer 111 and a liquid crystal layer 113, a retardation plate 117 arranged on the surface of the liquid crystal panel 115, an isotropic forward scattering plate 119 arranged on the surface of the retardation plate 117, and a polarizing plate 121 arranged on the surface of the forward scattering plate 119. In such a reflective liquid crystal device, external light incident through the polarizing plate 121 is scattered while passing through the forward scattering plate 119, and the scattered light is incident on the liquid crystal layer 115 through the retardation plate 117. Then, the light incident on the liquid crystal panel 115 passes through the liquid crystal layer 113 and is then reflected from the reflecting layer 111. Subsequently, the reflected light passes through the liquid crystal layer 113 and the retardation plate 117 again. Then, the reflected light is scattered in the forward scattering plate 119 and is then incident on the reflecting plate 121. When the liquid crystal layer 113 is a normally white type and no voltage is applied thereto, light can pass through the polarizing plate 121, resulting in a white display. On the other hand, when a voltage is applied, light is shielded by the polarizing plate 121 from the relationship between the oscillating direction of the light and the transmission axis of the polarizing plate 121, resulting in a black display.

A liquid crystal device has been suggested in which a scattering polarizing plate having both a scattering function and a polarizing function is used instead of using the forward scattering plate having only the scattering function.

That is, in the liquid crystal device in which a backlight, a polarizing plate, a liquid crystal cell, and another polarizing plate are deposited in this order, the polarizing plate on the backlight is generally formed by depositing a light-scattering type polarizing element and a light-absorbing type polarizing element in this order from the backlight, wherein the light-scattering type polarizing element has a polarization selecting layer for selectively passing a predetermined light component of linearly polarized light components and for selectively reflecting and scattering the other light components, and the light-absorbing type polarizing element has a polarization selecting layer for selectively passing a predetermined light component of the linearly polarized light components and for selectively absorbing the other light components. In the above-mentioned liquid crystal device, the polarized light transmitting axis of the light-scattering type polarizing element is substantially parallel to the polarized light transmitting axis of the light-absorbing type polarizing element, and the polarized light selecting layer of the light-absorbing type polarizing element is formed on the polarized light selecting layer of the light-scattering type polarizing element by a coating method.

However, in the liquid crystal device shown in FIG. 6, since all light components are scattered by an isotropic forward scattering plate, light scattering occurs even in a black display mode. As a result, some light components pass through the polarizing plate, and thus light cannot be completely shielded, thereby generating an image blur and the deterioration of contrast.

In the meantime, the main object of the illustrated conventional example is to improve the utilization efficiency of light using a thin liquid crystal device equipped with a scattering polarizing plate, but high contrast is not obtained by the liquid crystal device.

As a result of the inventors' assiduous examination, the inventors find the fact that a bright and high-contrast image display can be achieved in a liquid crystal device equipped with a forward scattering type polarizing plate having a transmission axis and a diffusion axis by appropriately arranging the forward scattering type polarizing plate and a polarizing plate.

SUMMARY

Accordingly, in order to solve the above problems, a first embodiment of present invention provides a liquid crystal device in which external light incident on a liquid crystal layer through a polarizing plate is reflected from a reflecting layer and then exits to the outside through the liquid crystal layer and the polarizing plate, thereby displaying an image, wherein a forward scattering type polarizing plate having a transmission axis and a diffusion axis is arranged between the polarizing plate and the liquid crystal layer such that the transmission axis of the forward scattering type polarizing plate is perpendicular to a transmission axis of the polarizing plate.

In the liquid crystal device according to the first embodiment of the present invention having the above structure, it is preferable that the transmission axis and diffusion axis of the forward scattering type polarizing plate be substantially perpendicular to each other.

In addition, in the liquid crystal device according to the first embodiment of the present invention having the above structure, it is preferable that the forward scattering type polarizing plate comprise a polymer film and minute regions dispersed in the polymer film, and that the polymer film and the minute regions have substantially the same refractive index (n1) with respect to one of linearly polarized light components perpendicular to each other, and have different refractive indexes (n2) with respect to the other of the linearly polarized light components.

Further, in the liquid crystal device according to the first embodiment of the present invention having the above structure, it is preferable that the reflecting layer be a transflective layer.

That is, it is preferable that the liquid crystal device be a transflective liquid crystal device having a transmissive mode in which light emitted from a light source is polarized by the liquid crystal layer and then the polarized light exits to the outside through the polarizing plate to display an image, and a reflective mode in which external light incident on the liquid crystal layer through the polarizing plate is reflected from the reflecting layer and then the reflected light exits to the outside through the liquid crystal layer and the polarizing plate to display an image.

Furthermore, in the liquid crystal device according to the first embodiment of the present invention having the above structure, it is preferable that a light source be provided below the transflective layer, and that light emitted from the light source pass through the liquid crystal layer to be polarized, and then the polarized light exit to the outside through the polarizing plate to display an image.

Moreover, in the liquid crystal device according to the first embodiment of the present invention having the above structure, it is preferable that a retardation plate be provided between the liquid crystal layer and the polarizing plate.

Further, in the liquid crystal device according to the first embodiment of the present invention having the above structure, it is preferable that a colored layer be further provided to perform color display. In addition, the colored layer is preferably provided on the reflecting layer so as to overlap with a portion of the reflecting layer.

A second embodiment of the present invention provides a liquid crystal device in which liquid crystal is interposed between a first substrate and a second substrate opposite to each other, comprising: a forward scattering type polarizing plate having a transmission axis and a diffusion axis, and a polarizing plate having a transmission axis, wherein the transmission axis of the forward scattering type polarizing plate is arranged perpendicular to the transmission axis of the polarizing plate, and light passing through the liquid crystal is incident on the polarizing plate through the forward scattering type polarizing plate.

Furthermore, in the liquid crystal device according to the second embodiment of the present invention having the above structure, it is preferable that the transmission axis and diffusion axis of the forward scattering type polarizing plate be substantially perpendicular to each other.

Moreover, it is preferable that the liquid crystal device according to the second embodiment of the present invention further comprise a pixel portion for transmitting or reflecting light.

Further, a third embodiment of the present invention provides an electronic apparatus comprising the liquid crystal device according to any one of the above-mentioned aspects.

In the liquid crystal device according to the first embodiment of the present invention, a predetermined forward scattering type polarizing plate is provided between the polarizing plate and the liquid crystal layer such that the transmission axis of the forward scattering type polarizing plate is perpendicular to the transmission axis of the polarizing plate. Therefore, in the white display mode, light is diffused while passing through the forward scattering polarizing plate, resulting in a bright display. On the other hand, in the black display mode, since light is minimally diffused while passing through the forward scattering polarizing plate, light can be completely shielded by the polarizing plate, thereby improving contrast.

In addition, in the liquid crystal device according to the first embodiment of the present invention, the transmission axis and diffusion axis of the forward scattering type polarizing plate are perpendicular to each other. Therefore, light can be diffused in the white display mode, and the diffusion of light can be completely prevented in the black display mode, thereby improving contrast.

Further, in the liquid crystal device according to the first embodiment of the present invention, since the forward scattering type polarizing plate having an anisotropic refractive index is used, a high transmittance can be achieved in the white display mode, resulting in a bright display. On the other hand, in the black display mode, since light is minimally diffused while passing through the forward scattering type polarizing plate, light can be completely shielded by the polarizing plate, thereby improving contrast.

Furthermore, in the liquid crystal device according to the first embodiment of the present invention, a transflective layer is used as the reflecting layer, and a predetermined forward scattering type polarizing plate is arranged. Therefore, it is possible to effectively improve contrast in both a reflective mode and a transmissive mode.

Moreover, in the liquid crystal device according to the first embodiment of the present invention, a predetermined light source is provided to display an image. Therefore, it is possible to display a high-contrast and bright image in both the reflective mode and the transmissive mode.

Further, in the liquid crystal device according to the first embodiment of the present invention, a retardation plate is provided at a predetermined position. Therefore, it is possible to display a high-contrast and bright image.

Furthermore, in the liquid crystal device according to the first embodiment of the present invention, a colored layer is further provided. Therefore, it is possible to display a high-contrast and bright color image.

Moreover, in the liquid crystal device according to the second embodiment of the present invention, the transmission axis of the forward scattering type polarizing plate is arranged perpendicular to the transmission axis of the polarizing plate, and light passing through liquid crystal is incident on the polarizing plate through the forward scattering type polarizing plate. Therefore, in the white display mode, light is diffused while passing through the forward scattering type polarizing plate, resulting in a bright display. On the other hand, in the black display mode, since light is minimally diffused while passing through the forward scattering type polarizing plate, light can be completely shielded by the polarizing plate, thereby improving contrast.

Further, in the liquid crystal device according to the second embodiment of the present invention, the transmission axis and diffusion axis of the forward scattering type polarizing plate are perpendicular to each other. Therefore, light can be diffused in the white display mode, and the diffusion of light can be completely prevented in the black display mode, thereby improving contrast.

Furthermore, in the liquid crystal device according to the second embodiment of the present invention, a predetermined pixel portion is further provided. Therefore, it is possible to achieve a transflective liquid crystal device capable of displaying a high-contrast and bright image.

Moreover, an electronic apparatus according to the third embodiment of the present invention makes it possible to display a high-contrast and bright image by comprising the liquid crystal device according to any one of the above-mentioned aspects.

DETAILED DESCRIPTION

First Embodiment

Figure 1:
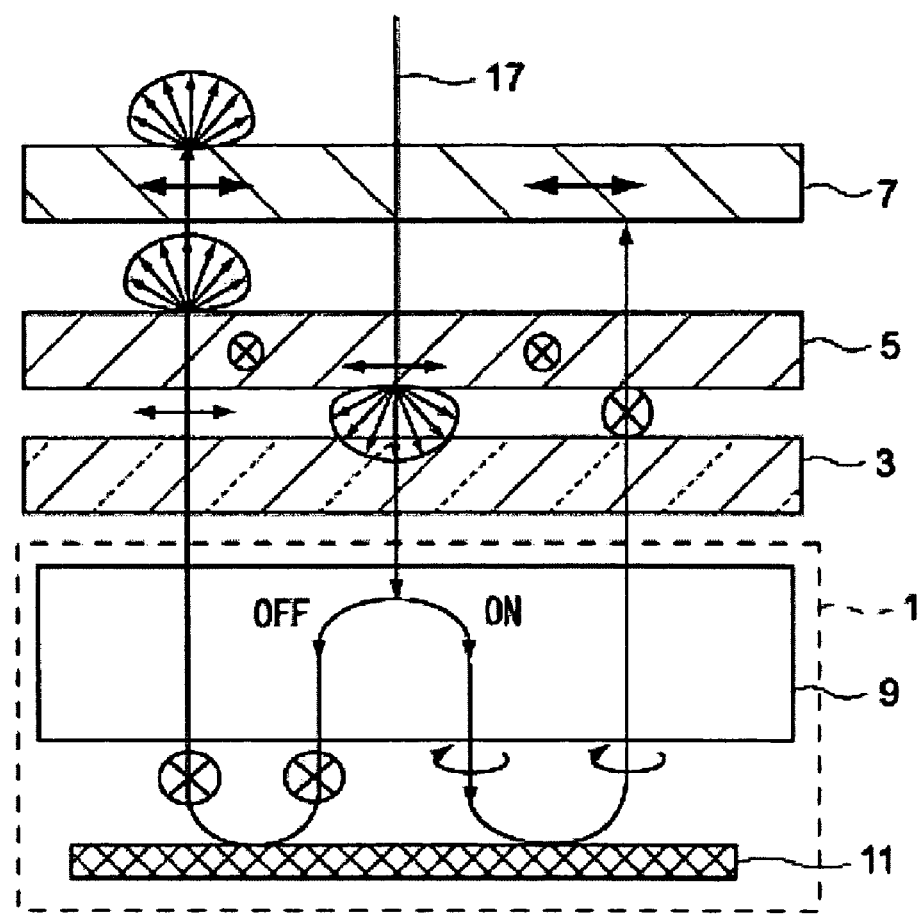
FIG. 1 is an explanatory diagram illustrating a reflective liquid crystal device according to a first embodiment of the present invention.

In a liquid crystal device according to the first embodiment, as shown in FIG. 1, external light incident on a liquid crystal layer through a polarizing plate is reflected from a reflecting layer and then exits to the outside through the liquid crystal layer and the polarizing plate, thereby displaying an image. A forward scattering type polarizing plate having a transmission axis and a diffusing axis is provided between the polarizing plate and the liquid crystal layer such that the transmission axis of the forward scattering type polarizing plate is perpendicular to the transmission axis of the polarizing plate.

FIG. 1 is an explanatory diagram illustrating the basic structure of the liquid crystal device according to the first embodiment of the present invention. As the liquid crystal device according to the present embodiment, a reflective liquid crystal device is used in which external light incident on the liquid crystal layer through the polarizing plate is reflected from the reflecting layer and then exits to the outside through the liquid crystal layer and the polarizing plate, thereby displaying an image.

As shown in FIG. 1, the liquid crystal device according to the present embodiment comprises a liquid crystal panel 1, a retardation plate 3 provided on the surface of the liquid crystal panel 1, a forward scattering type polarizing plate 5 provided on the surface of the retardation plate 3, and a polarizing plate 7 provided on the surface of the forward scattering type polarizing plate 5.

The liquid crystal panel 1 has a structure in which a liquid crystal layer 9 is interposed between two glass substrates (not shown) opposite to each other. A common electrode layer made of ITO (Indium Tin Oxide) and an alignment film (not shown), etc., are formed on the surfaces of the glass substrates. In addition, a reflecting layer 11 for reflecting incident light toward the outside is provided under the liquid crystal layer 9.

The liquid crystal layer in this embodiment may be a normally white type in which white display is made at the time when no voltage is applied or a normally black type in which black display is made at the time when no voltage is applied.

Figure 2:
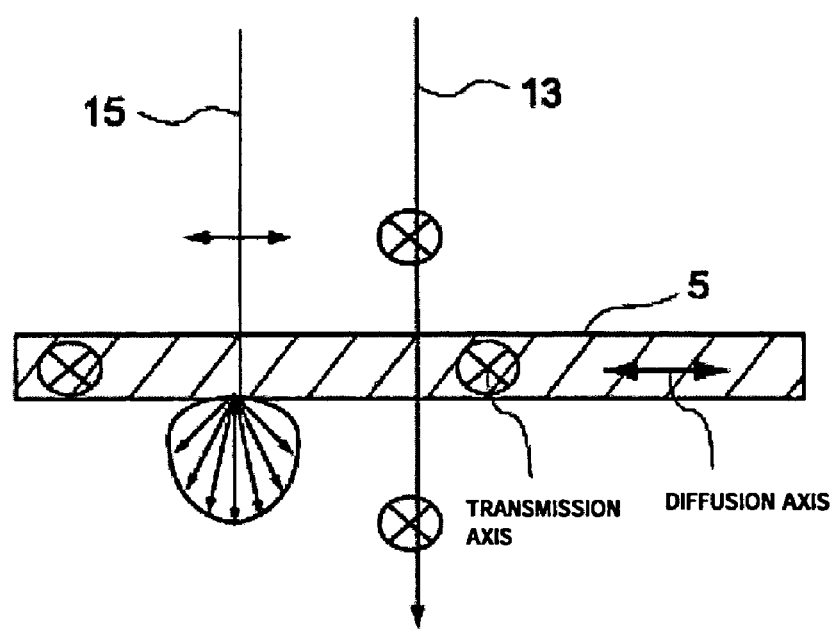
FIG. 2 is an explanatory diagram illustrating a forward scattering type polarizing plate according to the first embodiment of the present invention.

Further, the forward scattering type polarizing plate 5 is an optical film that allows the polarized light whose oscillating direction is equal to its transmission axis to be passed and that allows the polarized light whose oscillating direction is equal to its diffusion direction to be diffused forward. The characteristics of the forward scattering type polarizing plate 5 will be described in detail with reference to FIG. 2. As shown in FIG. 2, the forward scattering type polarizing plate 5 of the present embodiment has a diffusion axis in a direction parallel to the paper and a transmission axis in a direction perpendicular to the paper. When a light component 13 whose oscillating direction is perpendicular to the paper (the same direction as the transmission axis of the forward scattering type polarizing plate 5) is incident on the forward scattering type polarizing plate 5, the light component 13 passes through the forward scattering type polarizing plate 5 without diffusion. Meanwhile, when a light component 15 whose oscillating direction is parallel to the paper (the same direction as the diffusion axis of the forward scattering type polarizing plate 5) is incident on the forward scattering type polarizing plate 5, the light component 15 is diffused while passing through the forward scattering type polarizing plate 5.

As a specific example of the forward scattering type polarizing plate 5 having the above-mentioned characteristics, a polarizing element has been known, which is disclosed in Japanese Unexamined Patent Application Publication No. 9-274108. Specifically, the polarizing element has a structure in which minute regions are uniformly dispersed in a transparent polymer film and the material forming the minute regions is different from the material forming the polymer film. In addition, the minute regions and the polymer film have substantially the same refractive index (n1) with respect to one of the linearly polarized light components perpendicular to each other, and they have different refractive indexes (n2) with respect to the other of the linearly polarized light components.

A transparent polymer film is preferably used as the polymer film constituting a portion of the forward scattering type polarizing plate. In addition, an optical anisotropy member whose refractive indexes are different from each other with respect to the linearly polarized light components perpendicular to each other may be used in order to make it easy to obtain an operational effect. From this point of view, a uniaxially oriented polymer film made of various resins may be used. The polymer film may includes the following as a specific example: a film made of a polymer, such as polyethylene, polyethylenetelephthalate, polyethylenenaphthalate, polypropylene, polycarbonate, polystyrene, vinyl chloride, or polyvinyl alcohol; or a film formed by blending two or more of the above-mentioned polymers.

The minute regions are preferably made of a material different from the material forming a matrix polymer film. From the viewpoint of obtaining an excellent light scattering, supposing that the respective minute regions have substantially circular shapes that have the same area, the average diameter of the circles is in the range of 0.1 to 10 µm, and more preferably, in the range of 0.3 to 6 µm.

From the same viewpoint as that described above, the density in the dispersed arrangement, that is, the content of the minute region-forming material with respect to the polymer film-forming material is preferable in the range of 30 to 40 percent by weight.

Further, preferably, the refractive index (n1) of the minute region-forming material with respect to one of the linearly polarized light components is substantially equal to the refractive index of the polymer film, and the refractive index (n2) of the minute region-forming material with respect to the other of the linearly polarized light components is different from the refractive index of the polymer film. Specifically, a polymer material, liquid crystal, and various fillers satisfying the above-mentioned optical characteristics are preferably used among the film-forming materials that are exemplified as the material of the matrix polymer film.

Furthermore, from the viewpoint of light scattering and the degree of polarization, the difference between the refractive index of the polymer film and the refractive index (n2) of the minute region is more than 0.05, and more preferably, more than 0.1. Therefore, it is preferable that the respective materials be selected to satisfy the above conditions and that the materials be combined so as to have a value more than the above-mentioned difference of the refractive index.

Next, the arrangement relationship between the forward scattering type polarizing plate 5 and the polarizing plate 7 will be described. It is necessary that the forward scattering type polarizing plate 5 be arranged such that its transmission axis is substantially perpendicular to the transmission axis of the polarizing plate 7. Specifically, as shown in FIG. 1, it is preferable that the transmission axis of the polarizing plate 7 be parallel to the paper when the transmission axis of the forward scattering type polarizing plate 5 is perpendicular to the paper.

The reason is that the forward scattering type polarizing plate 5 is arranged in a cross Nicol manner with respect to the polarizing plate 7. That is, external light 17 is incident on the forward scattering type polarizing plate 5 through the polarizing plate 7. Since the diffusion axis of the forward scattering type polarizing plate 5 is parallel to the paper (see FIG. 2), the light incident on the forward scattering type polarizing plate 5 is diffused therein and is then incident on the liquid crystal panel 1 through the retardation plate 3. Then, the light incident on the liquid crystal panel 1 passes through the liquid crystal layer 9 and is reflected from the reflecting layer 11. Subsequently, the reflected light is incident on the liquid crystal layer 9 again and then passes through the respective layers.

In this case, when no voltage is applied, the incident light passes through the liquid crystal layer 9 to be linearly polarized and is then reflected from the reflecting layer 11. Then, the light passes through the retardation plate 3 and the polarizing plate 7 in order, resulting in a white display. In this case, since the reflected light is diffused while passing through the diffusing axis of the forward scattering type polarizing plate 5, the light appears to be bright.

On the contrary, when a voltage is applied, the incident light passes through the liquid crystal layer 9 to be circularly polarized and is then reflected from the reflecting layer 11. Then, the light passing through the retardation plate 3 passes through the forward scattering type polarizing plate 5 without diffusion and is incident on the polarizing plate 7 since its oscillating direction coincides with the transmission axis of the forward scattering type polarizing plate 5. Since the oscillating direction of the light incident on the polarizing plate 7 does not coincide with the transmission axis of the polarizing plate 7, the light is shielded by the polarizing plate 7, resulting in a black display.

In the case of the black display, since light is not diffused in the forward scattering type polarizing plate 5, light is reliably shielded by the polarizing plate 7. Therefore, it is possible to improve contrast without generating a so-called image blur.

As described above, in the present embodiment, the forward scattering type polarizing plate 5 is used, and the transmission axis of the forward scattering type polarizing plate 5 is arranged perpendicular to the transmission axis of the polarizing plate 7. Therefore, in the case of the white display, light is diffused in the forward scattering type polarizing plate 5 to appear to be bright. On the contrary, in the case of the black display, since light is not diffused in the forward scattering type polarizing plate 5, light is reliably shielded by the polarizing plate 7, and thus the so-called image blur is not generated. As a result, it is possible to improve contrast.

Second Embodiment

Figure 3:
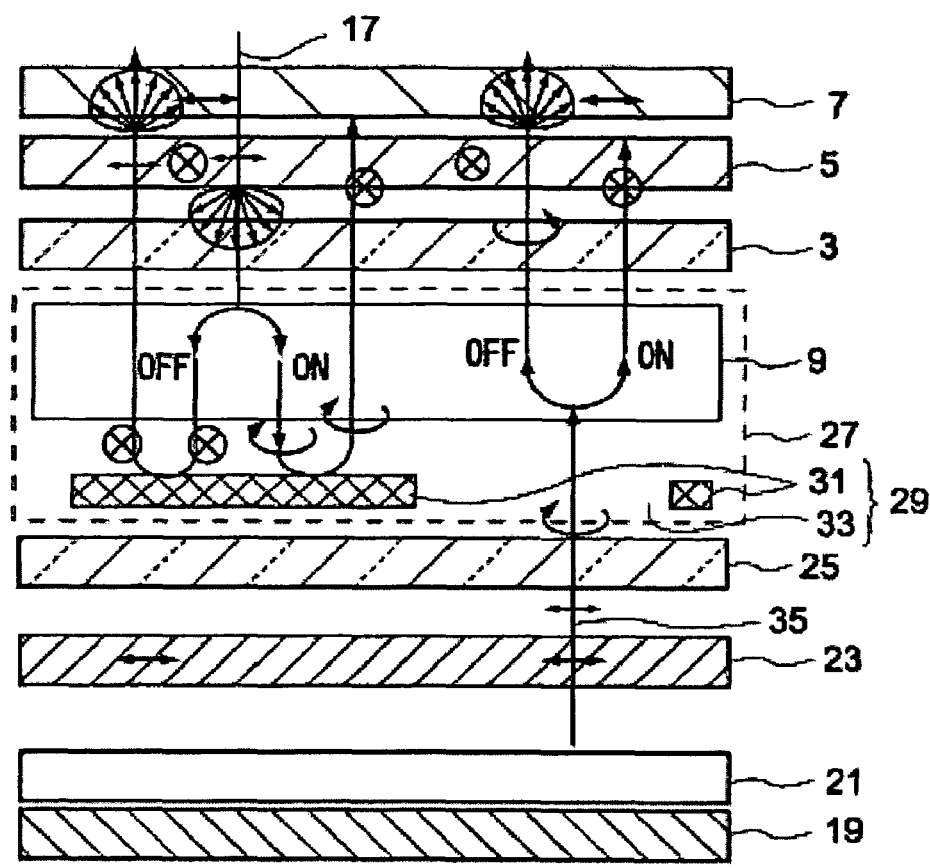
FIG. 3 is an explanatory diagram illustrating a transflective liquid crystal device according to a second embodiment of the present invention.

FIG. 3 is an explanatory diagram illustrating the basic structure of a liquid crystal device according to a second embodiment of the present invention. In FIG. 3, the same components as those in FIG. 1 have the same reference numerals, and the description thereof will be omitted for the simplicity of explanation.

The second embodiment relates to a transflective liquid crystal device having a transmissive mode in which an image is displayed using the light emitted from a light source and a reflective mode in which an image is displayed using external light.

As shown in FIG. 3, the liquid crystal device according to the present embodiment comprises a backlight 21 arranged on the surface of a reflecting plate 19, a polarizing plate 23 arranged on the surface of the backlight 21 for passing only the light component polarized in one direction, and a retardation plate (a quarter-wave plate) 25 arranged on the surface of the polarizing plate 23.

In addition, a liquid crystal panel 27 is arranged on the surface of the retardation plate 25. The liquid crystal layer 9 constituting the liquid crystal panel 27 is the same as that in the first embodiment. A transflective layer 29 comprising a reflecting portion in which a reflecting layer 31 is arranged and a transmitting portion 33 in which the reflecting layer 31 is not arranged is formed on the underside of the liquid crystal layer 9.

Further, the surface structure of the liquid crystal panel 27 is the same as that in the first embodiment, and thus the description thereof will be omitted for the simplicity of explanation.

Next, the operation of the liquid crystal device according to the present embodiment having the above structure will be described.

In the transmissive mode, light 35 emitted from the backlight 21 passes through the polarizing plate 23 and is then circularly polarized in phase (see an arrow on the right side of FIG. 3) by passing through the retardation plate 25. Then, the polarized light is incident on the liquid crystal layer 9 through the transmitting portion 33.

When no voltage is applied, the light passing through the liquid crystal layer 9 is incident on the forward scattering type polarizing plate 5 through the retardation plate 3. Then, the light incident on the forward scattering type polarizing plate 5 is circularly polarized, and thus some light components whose oscillating directions coincide with the diffusion axis of the forward scattering type polarizing plate 5 are diffused in the forward scattering type polarizing plate 5. Subsequently, the diffused light passes through the polarizing plate 7 to appear to be bright.

On the contrary, when a voltage is applied, the oscillating direction of light is shifted by 90 degrees while passing through the liquid crystal layer 9 and the retardation plate 3. Therefore, the oscillating direction of the light incident on the forward scattering type polarizing plate 5 coincides with the transmission axis of the forward scattering type polarizing plate 5, and thus the light can pass through the forward scattering type polarizing plate 5 without diffusion. Since the oscillating direction of the light passing through the forward scattering type polarizing plate 5 does not coincide with the transmission axis of the polarizing plate 7, light is effectively shielded by the polarizing plate 7 to appear to be black. In the case of the black display, since light is not diffused in the forward scattering type polarizing plate 5, it is possible to improve contrast in the polarizing plate 7 without generating the so-called image blur.

The operation of the reflective mode using external light 17 is the same as that in the first embodiment, and thus the description thereof will be omitted.

As described above, the present embodiment makes it possible to display a high-contrast and bright image in both the transmissive mode and the reflective mode.

Third Embodiment

Figure 4:
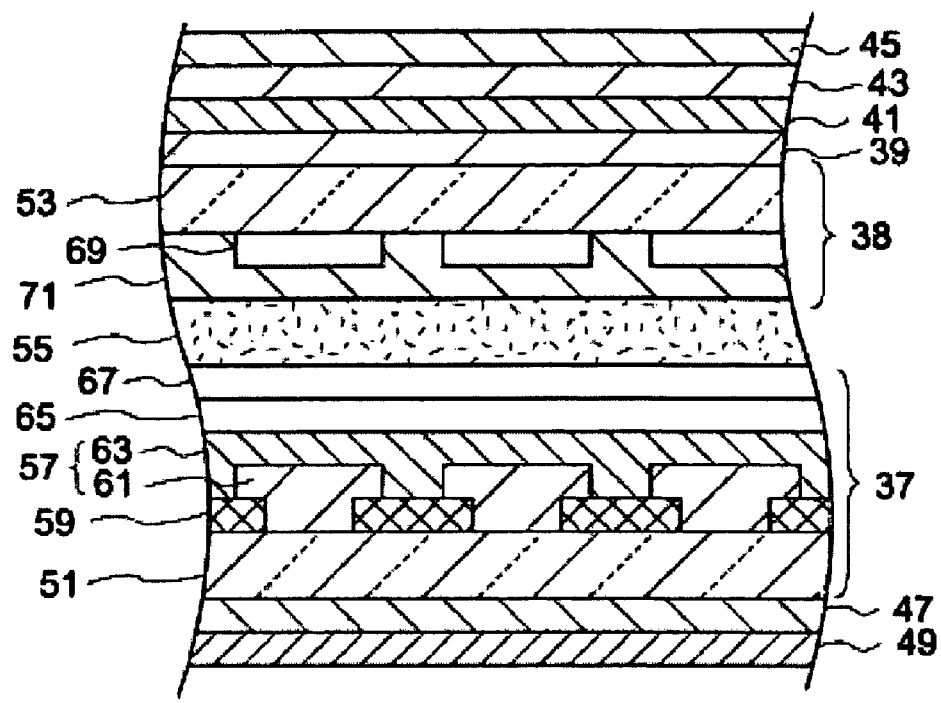
FIG. 4 is an explanatory diagram illustrating a color liquid crystal device according to a third embodiment of the present invention.

FIG. 4 is an explanatory diagram illustrating a third embodiment of the present invention. The third embodiment relates to a transflective color liquid crystal device using color filters.

As shown in FIG. 4, the color liquid crystal device according to the third embodiment comprises a color filter substrate 37 and a counter substrate 38 opposite to each other, a forward scattering type polarizing plate 39 provided on the surface of the counter substrate 38 (on the side opposite to the color filter substrate 37), a first retardation plate 41 provided on the surface of the forward scattering type polarizing plate 39, a second retardation plate 43 provided on the surface of the first retardation plate 41, and a polarizing plate 45 provided on the surface of the second retardation plate 43.

In addition, the color liquid crystal device further comprises a retardation plate (a quarter-wave plate) 47 provided on one surface of the color filter substrate 37 (on the side opposite to the counter substrate 38), a polarizing plate 49 provided on the surface of the retardation plate 47, and a backlight unit (not shown) provided on the underside of the polarizing plate 49.

As shown in FIG. 4, generally, the color liquid crystal device is constructed such that a liquid crystal layer 55 and color filters 57 are arranged between two glass substrates 51 and 53. More specifically, on the surface of the glass substrate 51 (on the side opposite to the glass substrate 53), a reflecting layer 59 made of a material, such as aluminum, a colored layer 61 formed on every pixel, and an overcoat layer 63 covering the colored layer 61 are formed in this order. In general, a combination of the colored layer 61 and the overcoat layer 63 is called a color filter 57.

Further, a transparent electrode 65 composed of a transparent conductor, such as ITO (Indium Tin Oxide), is formed on the overcoat layer 63. An alignment film 67 made of polyimide resin is formed on the surface of the transparent electrode 65 for facilitating the drive of liquid crystal by the application of voltage.

A transparent electrode 69, which is the same as that provided on the glass substrate 51, is formed on the surface of the glass substrate 53 (on the side of the glass substrate 51) opposite to the glass substrate 51, and an alignment film 71 is formed on the transparent electrode 69.

The colored layer 61 is generally colored by dispersing a colorant, such as dye or pigment, in a transparent resin to obtain a predetermined color. The color of the colored layer 61 is obtained, for example, by combining the three primary colors R (red), G (green), and B (blue). However, the present invention is not limited thereto, and the color of the colored layer 61 may be obtained by combining three colors Y (yellow), M (magenta), and C (cyan), or colors of other color systems.

The colored layer 61 is generally formed in such a manner that a colored resist that is composed of a photosensitive resin containing a colorant, such as dye or pigment, is applied on the surface of a substrate, and unnecessary portions thereof are removed by a photolithography method to form a predetermined color pattern. In addition, when forming the colored layers having a plurality of colors, the above-mentioned processes are repeatedly performed.

In the present embodiment having the above structure, the light emitted from a backlight unit to the polarizing plate 49 passes through the retardation plate 47 to be circularly polarized and is then incident on the color filter substrate 37. Subsequently, the light incident on the color filter substrate 37 is incident on the colored layer 61 through gaps in the reflecting layer 59 and then passes through the liquid crystal layer 55 and the counter substrate 38 to be incident on the forward scattering type polarizing plate 39. Then, the light incident on the forward scattering type polarizing plate 39 is diffused in the forward scattering type polarizing plate 39 in the white display mode at the time when no voltage is applied. The diffused light passes through the first and second retardation plates 41 and 43, and the polarizing plate 45 in this order and exits to the outside.

On the other hand, in the black display mode at the time when a voltage is applied, light passes through the forward scattering type polarizing plate 39 without diffusion and is then incident on the first and second retardation plates 41 and 43 in order. Then, the light is shielded by the polarizing plate 45.

Similar to the second embodiment, according to the present embodiment, in the white display mode, the light emitted from the backlight unit is diffused in the forward scattering type polarizing plate 39 and then exits to the outside, resulting in a bright display. On the other hand, in the black display mode, light passes through the forward scattering type polarizing plate 39 without diffusion and is shielded by the polarizing plate 45. Therefore, it is possible to improve contrast without generating the so-called image blur.

Meanwhile, external light incident on the polarizing plate 45 passes through the counter substrate 38, the liquid crystal layer 55, and the colored layer 61 in order and is then reflected from the reflecting layer 59. Then, the reflected light passes through the colored layer 61, liquid crystal layer 55, and the counter substrate 38 again and is incident on the forward scattering type polarizing plate 39. The travel of the light incident on the forward scattering type polarizing plate 39 is the same as that of the light emitted from the backlight unit. That is, in the white display mode, light is diffused in the forward scattering type polarizing plate 39 and then exits to the outside, resulting in a bright display. In the black display mode, light passes through the forward scattering type polarizing plate 39 without diffusion and is then shielded by the polarizing plate 45, thereby improving contrast without generating the so-called image blur.

In the transmissive mode, the light emitted from the backlight unit passes through the colored layer 61 only one time, but the reflected light passes through the colored layer 61 of the color filter substrate 37 twice. However, since a portion of the colored layer 61 that is located above the reflecting layer 59 is set to be half the thickness of the entire colored layer 61, the distance where light passes through the colored layer is the same in both the transmissive mode and the reflective mode. That is, since the transmission length of light in the colored layer is the same in both the transmissive mode and the reflective mode, it is possible to perceive the same coloring property of the colored layer.

As described above, according to the present embodiment using the color filter substrate 37, in both the transmissive mode and the reflective mode, a bright display is achieved in the white display mode, and an image blur is not generated in the black display mode, thereby improving contrast.

Fourth Embodiment

The fourth embodiment of the present invention relates to an electronic apparatus in which the liquid crystal device according to the present invention is used as a display device.

Figure 5:
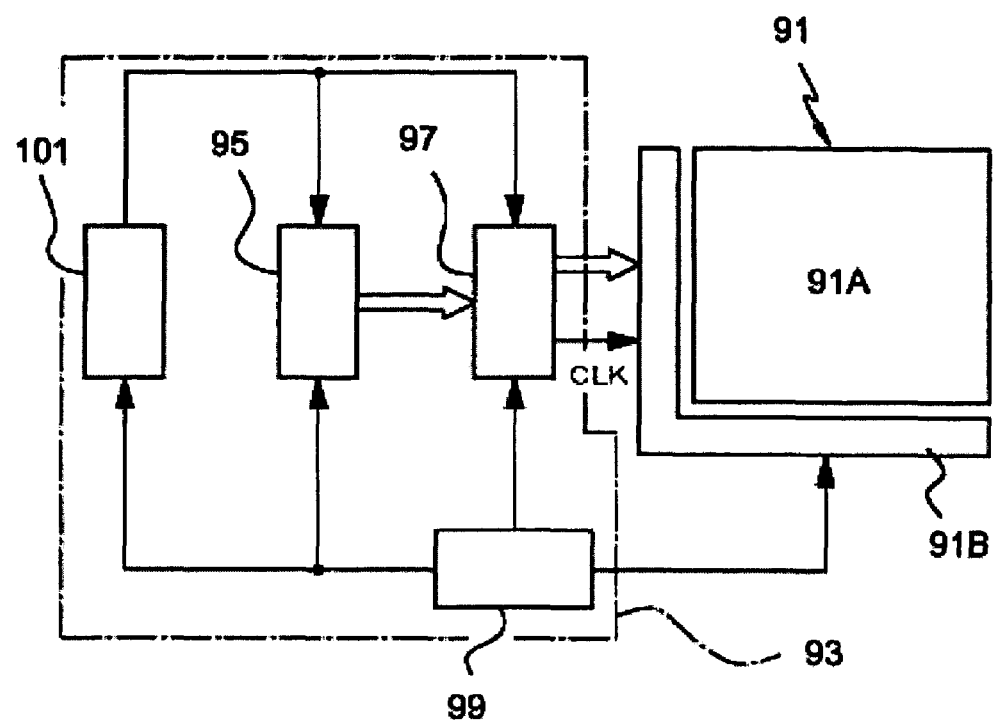
FIG. 5 is an explanatory diagram illustrating an electronic apparatus according to a fourth embodiment of the present invention.
Figure 6:
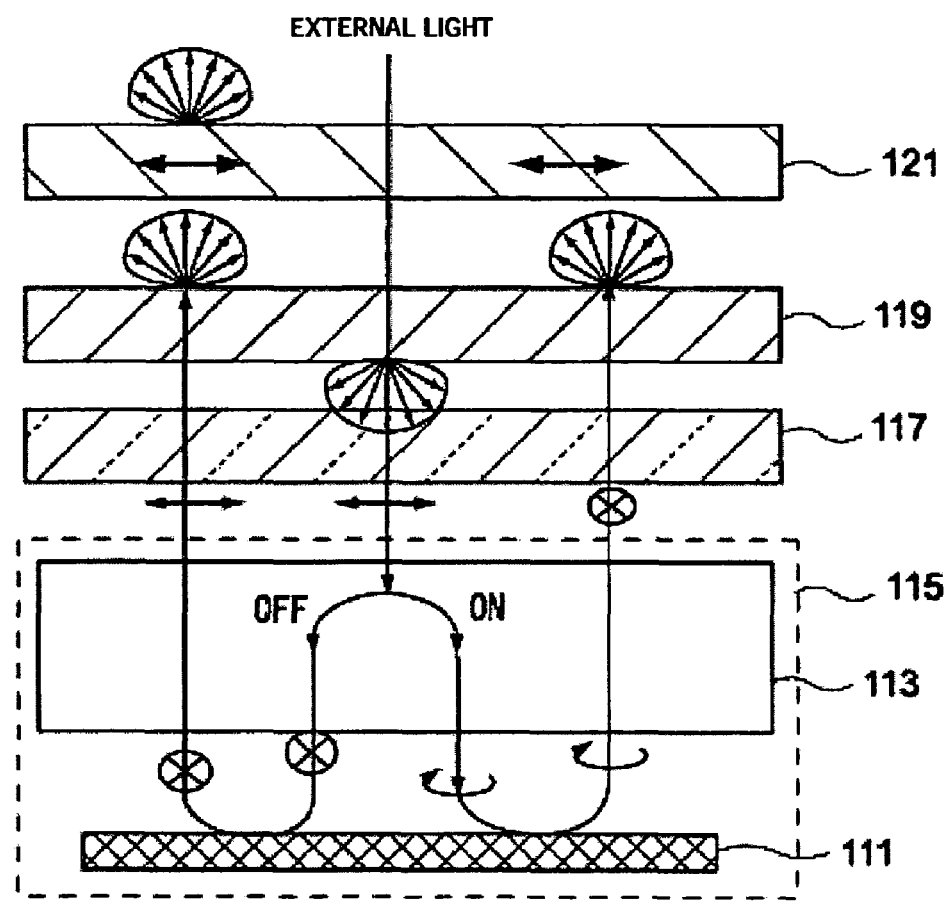
FIG. 6 is an explanatory diagram illustrating a conventional reflective liquid crystal device.

FIG. 5 is a view schematically illustrating the entire structure of the electronic apparatus according to the fourth embodiment. As shown in FIG. 5, the electronic apparatus comprises a liquid crystal panel 91 and control means 93 for controlling the liquid crystal panel 91. FIG. 5 is a view of the liquid crystal panel 91 comprising a panel body 91A and a driving circuit 91B composed of semiconductor elements (IC chips). Preferably, the control means 93 comprise a display information outputting source 95, a display processing circuit 97, a power circuit 99, and a timing generator 101.

The display information outputting source 95 comprises a memory, such as a ROM (Read Only Memory) or a RAM (Random Access Memory), a storage unit, such as a magnetic storage disk or an optical storage disk, and a tuning circuit for tuning and outputting digital image signals. It is preferable that the display information outputting source 95 supply display information to the display information processing circuit 97 in the form of image signals having a predetermined format, based on various clock signals generated by the timing generator 101.

The display information processing circuit 97 comprises a serial-parallel conversion circuit, an amplification and inversion circuit, a rotation circuit, a gamma correction circuit, and a clamp circuit. The display information processing circuit 97 processes the input image information and then supplies the processed image information to the driving circuit 91B together with a clock signal CLK. The driving circuit 91B comprises a scanning line driving circuit, a data line driving circuit, and a test circuit. The power circuit 99 applies a predetermined voltage to the respective components.

In addition, the electronic apparatus of the present embodiment comprises the liquid crystal panel 91 in which the forward scattering type polarizing plate having a transmission axis and a diffusion axis is provided between the polarizing plate and the liquid crystal layer such that the transmission axis of the forward scattering type polarizing plate is perpendicular to the transmission axis of the polarizing plate. Therefore, it is possible to achieve an electronic apparatus capable of displaying a bright and high-contrast image.

The present invention makes it possible to display a bright and high-contrast image. Therefore, the present invention can be applied to liquid crystal devices and electronic apparatuses in which liquid crystal is used as a display material, such as a mobile phone, a personal computer, a liquid crystal television, a viewfinder type and monitor-direct-view type videotape recorder, a car navigation apparatus, a pager, an electrophoresis apparatus, an electronic organizer, an electronic calculator, a word processor, a work station, a television phone, a POS terminal, and an electronic apparatus equipped with a touch panel.

The present invention is not limited to the above-mentioned exemplary embodiments, and can be appropriately modified within the scope or spirit of the invention. For example, although the liquid crystal panels according to the above-mentioned embodiments each have a simple matrix structure, the present invention can be applied to active matrix liquid crystal devices using active elements (active elements), such as TFTs (thin film transistors) or TFDs (thin film diodes).

Further, the liquid crystal panels of the above-mentioned embodiments have a COG-type structure. However, the liquid crystal panel can be constructed such that semiconductor elements (IC chips) are not directly mounted thereto. For example, a flexible wiring substrate or a TAB substrate can be connected to the liquid crystal panel.

What is claimed is:

1. A liquid crystal device comprising:
a liquid crystal layer;
a polarizing plate on the liquid crystal layer, the polarizing plate having a transmission axis;
a reflecting layer on an opposite side of the liquid crystal layer relative to the polarizing plate; and
a forward scattering polarizing plate between the polarizing plate and the liquid crystal layer, the forward scattering polarizing plate having a transmission axis and a diffusion axis, the transmission axis of the forward scattering polarizing plate being perpendicular to the transmission axis of the polarizing plate.

2. The liquid crystal device according to claim 1, wherein the transmission axis and diffusion axis of the forward scattering polarizing plate are substantially perpendicular to each other.

3. The liquid crystal device according to claim 1, wherein the forward scattering polarizing plate comprises a polymer film and minute regions of other material dispersed in the polymer film, and
wherein the polymer film and the minute regions have substantially the same refractive index (n1) with respect to one of linearly polarized light components perpendicular to each other, and have different refractive indexes (n2) with respect to the other of the linearly polarized light components.

4. The liquid crystal device according to claim 1, wherein the reflecting layer comprises a transflective layer.

5. The liquid crystal device according to claim 4, wherein a light source is provided on an opposite side of the transflective layer relative to the liquid crystal layer; and
wherein light emitted from the light source passes through the liquid crystal layer to be polarized, and the polarized light exits to the outside through the polarizing plate to display an image.

6. The liquid crystal device according to claim 1, wherein a retardation plate is provided between the liquid crystal layer and the polarizing plate.

7. The liquid crystal device according to claim 1, wherein a colored layer is provided proximate the liquid crystal layer to perform color display.

8. A liquid crystal device comprising:
a first substrate;
a second substrate opposed to the first substrate;
liquid crystal interposed between the first substrate and the second substrate;
a forward scattering polarizing plate on the second substrate, the forward scattering polarizing plate having a transmission axis and a diffusion axis; and
a polarizing plate on the forward scattering polarizing plate, the polarizing plate having a transmission axis;
wherein the transmission axis of the forward scattering polarizing plate is perpendicular to the transmission axis of the polarizing plate; and wherein light having passed through the liquid crystal is incident on the polarizing plate via the forward scattering polarizing plate.

9. The liquid crystal device according to claim 8, wherein the transmission axis and diffusion axis of the forward scattering polarizing plate are substantially perpendicular to each other.

10. The liquid crystal device according to claim 8, further comprising a pixel portion proximate the liquid crystal for at least one of transmitting and reflecting light.

11. An electronic apparatus comprising the liquid crystal device according to claim 1.

* * * * *